(12) United States Patent
Demir et al.

(10) Patent No.: US 6,680,791 B2
(45) Date of Patent: Jan. 20, 2004

(54) SEMICONDUCTOR DEVICE FOR RAPID OPTICAL SWITCH BY MODULATED ABSORPTION (75) Inventors: Hilmi Volkan Demir, Mountain View, CA (US); David A. B. Miller, Stanford, CA (US); Vijit Sabnis, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 31 days.

(21) Appl. No.: 10/075,921

(22) Filed: Feb. 13, 2002

(65) Prior Publication Data

US 2003/0063362 A1 Apr. 3, 2003

Related U.S. Application Data (60) Provisional application No. 60/326,552, filed on Oct. 1, 2001.

(51) Int. Cl.[7] .............................. G02F 1/03; G02F 1/07
(52) U.S. Cl. ........................ 359/248; 359/245; 359/247
(58) Field of Search .................................. 359/248, 245, 359/247; 385/123, 8, 131; 257/14, 96, 98, 90, 94

(56) References Cited

U.S. PATENT DOCUMENTS

| | | | |
|---|---|---|---|
| 3,840,741 A | * 10/1974 | Melchior ................. 250/214 R |
| 4,364,072 A | * 12/1982 | Nishizawa .................. 257/264 |
| 4,431,914 A | * 2/1984 | Mourou et al. ......... 250/214 R |
| 4,525,687 A | 6/1985 | Chemla et al. ............ 332/7.51 |
| 4,546,244 A | 10/1985 | Miller ........................ 250/211 |
| 5,339,090 A | * 8/1994 | Crossland et al. ............ 345/90 |
| 5,339,370 A | 8/1994 | Sano et al. ...................... 385/2 |
| 5,343,700 A | 9/1994 | Fujimoto et al. ............. 60/276 |
| 5,504,609 A | 4/1996 | Alexander et al. .......... 359/125 |
| 5,608,566 A | 3/1997 | Dutta et al. ................. 359/248 |
| 5,825,517 A | 10/1998 | Antoniades et al. ........ 359/117 |
| 6,445,839 B1 | * 9/2002 | Miller .......................... 385/17 |

OTHER PUBLICATIONS

David A.B. Miller et al., "The Quantum Well Self–Electrooptic Effect Device: Optoelectronic Bistability and Oscillation, and Self–Linearized Modulation", IEEE Journal of Quantum Electronics, vol. QE–21, No. 9, Sep. 1985, pp. 1462–1476.
G. Livescu et al., "High–speed absorption recovery in quantum well diodes by diffusive electrical conduction", Applied Physics Letters, vol. 54, No. 8, Feb. 20, 1989, pp. 748–750.
M.B. Yairi et al., "High–speed, optically controlled surface–normal optical switch based on diffusive conduction", Applied Physics Letters, vol. 75, No. 5, Aug. 2, 1999, pp. 597–599.

* cited by examiner

Primary Examiner—Jordan M. Schwartz
Assistant Examiner—Jessica Stultz
(74) Attorney, Agent, or Firm—Lumen Intellectual Property Services, Inc.

(57) ABSTRACT

This invention relates to a semiconductor device and method for switching or modulating optical signals. The semiconductor device has a photodetector having a low electrical capacitance $C_d$, a detector absorbing layer for absorbing an optical signal beam, a modulator having a low capacitance $C_m$ and a modulator absorbing layer exhibiting an electric field-dependent absorption coefficient. The modulator absorbing layer is used for absorbing an optical power beam, which is to be modulated or switched. The device has a low resistivity region between the photodetector and the modulator such that the electric field-dependent absorption coefficient is altered uniformly and rapidly throughout the modulator absorbing layer during absorption of the optical signal beam in the detector absorbing layer. The device is equipped with a high resistivity element in series with the low resistivity region for minimizing a net charge flow to and from the device.

30 Claims, 7 Drawing Sheets

SEMICONDUCTOR DEVICE FOR RAPID OPTICAL SWITCH BY MODULATED ABSORPTION

RELATED APPLICATIONS

This patent application is based on provisional patent application 60/326,552, filed on Oct. 1, 2001 that is herein incorporated by reference.

STATEMENT REGARDING FEDERALLY SPONSORED RESEARCH OR DEVELOPMENT

This invention was made with Government support under grant number DAAD17-99-C-0048 awarded by the Defense Advanced Research Projects Agency. The U.S. government has certain rights in this invention.

FIELD OF THE INVENTION

This invention relates generally to optical signal processing, and more particularly it relates to semiconductor devices that can function as optical switches in which one optical beam modulates another without the need to transform either beam to an electrical signal.

BACKGROUND ART

Communications systems are increasingly using optical fiber as the transmission medium for propagating optical beams that carry information. Optical fiber exhibits many advantages including low loss, immunity to interference, and an extremely large bandwidth. In wavelength-division-multiplexed (WDM) systems, multiple wavelengths of light are used to establish many communication channels in a single optical fiber. The use of a number of channels at different wavelengths increases information throughput and correspondingly augments system capacity. In a typical WDM system, information-bearing optical beams or optical signal beams at the selected channel wavelengths are mixed together or multiplexed with the aid of optical couplers and launched into the fiber. At the receiver the optical signal beams are separated or demultiplexed by optical filters.

It is often necessary to transfer optical signals between optical networks operating at different wavelengths, swap channels within the same network or perform other functions requiring a particular optical signal beam to be converted and transmitted at a different wavelength. For example, a transmission system may be set up to send all information at a first wavelength to a first destination, and all information at a second wavelength to a second destination. Changing the wavelength of the optical signal beam from the first to the second wavelength therefore switches the destination of the information borne by the optical signal beam. The process of changing the information from one signal light beam to another can also be used to regenerate the signal, that is, to improve the quality of the signal.

The transfer of an optical signal beam from one channel requires both a device that can convert signal wavelengths and system architecture, incorporating the device, which can be scaled to required capacities. The prior art describes several devices and systems for such purposes.

A WDM optical system is disclosed in U.S. Pat. No. 5,504,609 to Alexander et al. This system includes complex remodulators for transferring a signal from an input wavelength to an output wavelength. Each remodulator contains a photodiode or similar means for converting an optical input signal to an electrical signal, which is then amplified, filtered, and amplified again. The resultant electrical signal is used to modulate an optical source by exploiting the electro-optical effect in a waveguide medium to create an amplitude-modulated output signal. The combination of electronic and optical elements required in the system of Alexander et al. greatly limit the net throughput of the system, and do not effectively take advantage of the increased bandwidth provided by the optical fiber. The remodulators also dissipate large amounts of power and make large arrays of switches impractical.

An all-optical wavelength converter is provided in U.S. Pat. No. 5,343,700 to Yoo. The converter acts as a nonlinear mixer to combine an input signal with a pump signal to generate an output signal of a different wavelength. Specifically, the output frequency is the difference between the pump frequency and the input frequency. The pump frequency determines the frequency shift according to the known rules of difference frequency generation (DFG). This device cannot be used to convert multiple input channels to multiple output channels selectively. Instead, a separate device is required to convert between each input frequency and output frequency, requiring a set of parallel converters operating between neighboring WDM networks. Of course, this system cannot practically be scaled to WDM systems containing large numbers of channels. Furthermore, systems based on these techniques dissipate large amounts of power and are therefore not feasible for large-scale systems.

The technique of DFG employed by the device of Yoo is used in a parametric wavelength interchanging cross-connect, described in U.S. Pat. No. 5,825,517 to Antoniades et al. The cross-connect of Antoniades et al. combines 2×2 spatial optical switches with the wavelength converters of Yoo to allow arbitrary switching of signals among the channels of the WDM network. By selecting particular wavelengths of pump sources, the wavelength converters can be made to interchange signals between two channels in a single device. In other words, each wavelength converter in the cross-connect takes two input signals with wavelengths $\lambda_2$ and $\lambda_2$, and produces two output signals of wavelengths $\lambda_2$ and $\lambda_1$, transferring the information carried by input signal at wavelength $\lambda_1$ to output signal at wavelength $\lambda_2$, and vice versa. Switching between systems with more than two channels requires complicated networks of 2×2 spatial switches and wavelength converters. Because each wavelength converter is limited to a few predetermined frequencies, arbitrary switching requires a series of wavelength converters, each of which has a different pump frequency. In addition, the cross-connect of Antoniades et al. uses only a single set of WDM wavelengths for both input and output signals, and does not allow for truly arbitrary switching.

Optical switches for wavelength conversion by means other than nonlinear optical frequency conversion have also been disclosed in the prior art. A number of these switches take advantage of the electroabsorption effect allowing some of these devices to operate on picosecond time scales. A high-speed electro-optical modulator is disclosed in U.S. Pat. No. 4,525,687 to Chemla et al. This semiconductor device contains a multiple quantum well structure across which an electric field is applied. The applied electric field increases absorption of light particles or photons having energies just below the band gap by the quantum-confined Stark effect (QCSE). As the electric field is increased further, the band edge shifts to lower photon energies. By carefully controlling an applied voltage, and therefore the applied electric field, optical properties of the device can be changed at will. An optical signal beam consisting of photons whose photon energy is just below the band gap of the quantum well structure is absorbed or transmitted with just a small change in the applied voltage. Because this device is an electronically-controlled optical modulator, it cannot be used alone to provide the wavelength conversion required in WDM systems. The desired result can only be produced by combining this device with a photodetector for generating the required electrical signal in response to the optical signal. As with the system of Alexander et al., the combination is complicated, incurs high power dissipation, cannot operate at the required switching speeds, and is not easily integrated into arrays.

In U.S. Pat. No. 5,339,370 Sano et al. teach an optical modulator whose light absorptive layer changes its absorption as a function of voltage applied across the modulator. Sano et al. also teach the use of the optical modulator in an optical communication system. This type of optical modulator is responsive directly to an electrical control signal and is not designed to switch optical signals in response to other optical signals. In addition, it is not suitable for fast-switching WDM networks because of its low response speed. A related type of modulator employing a multiple quantum well in which absorption is changed by an applied voltage is taught by Dutta et al. in U.S. Pat. No. 5,608,566 entitled multi-directional electro-optic switch. This switch can be used to switch optical signals between waveguides but, as in the case of the modulator of Sano et al., it is not responsive to another optical signals and its response time is too slow to be used in fast-switching WDM networks.

In U.S. Pat. No. 4,546,244 Miller teaches a nonlinear and bistable optical device with low switching energy. The device uses a means responsive to light for generating a photocurrent, a structure with a semiconductor quantum well, and a means responsive to the photocurrent for electrically controlling an optical absorption of the semiconductor quantum well region. The optical absorption of the semiconductor quantum well region varies in response to variations in the photocurrent and is used to modulate the absorption of a second light beam. Miller's optical device can be integrated into an array and the response of the semiconductor quantum well region to the photocurrent can be used to modulate the second beam.

Unfortunately, the response times of Miller's device are slow due to the low speed at which photocarriers propagate from the means generating the photocurrent to the means which control the optical absorption of the semiconductor quantum well region. For additional information on the physical principles governing the behavior of nonlinear bistable optical devices of this type the reader is referred to David A. B. Miller et al., "The Quantum Well Self-Electrooptic Effect Device: Optoelectronic Bistability and Oscillation, and Self-Linearized Modulation", IEEE Journal of Quantum Electronics, Vol. QE-21, No. 9, September 1985, pp. 1462–1476 and G. Livescu et al., "High-speed absorption recovery in quantum well diodes by diffusive electrical conduction", Applied Physics Letters, Vol. 54, No. 8, 20 February 1989, pp. 748–750.

The problem of slow electrical response to the absorption of photons has been recognized in the prior art. In order to speed up the response of their optoelectronic modulator M. B. Yairi et al., "High-speed, optically controlled surface-normal optical switch based on diffusive conduction", Applied Physics Letters, Vol. 75, No. 5, 2 August 1999, pp. 597–599 teach reliance on the mechanism of diffusive conduction to modulate absorption or reflection. The modulator taught by M. B. Yairi is designed to operate on successive light pulses and is not suitable for WDM systems.

Thus, there is a need for a device that can modulate an optical beam rapidly in response to another optical beam. Furthermore, there is a need for a switch that can be designed to perform the function of an optical cross-connect or a wavelength interchanger with response times on the order of tens of ps or less. It would be a further improvement to render such modulator or switch integrable in array structures that can operate on many optical signal beams simultaneously.

OBJECTS AND ADVANTAGES

In view of the above, it is an object of the present invention to provide an optical modulator that can rapidly modulate an optical power beam in response to another optical signal beam. These two beams can have two different wavelengths or the same wavelength.

It is another object of the invention to provide an optical switch that can be used for wavelength switching in optical networks such as WDM networks.

Yet another object of the invention is to provide an optical switch that can be easily integrated into arrays including waveguides for guiding the optical beams.

These and other advantages and objects of the invention will become apparent from the ensuing description.

SUMMARY OF THE INVENTION

The objects and advantages of the invention are secured by a semiconductor device equipped with a photodetector having a low electrical capacitance $C_d$ and a detector absorbing layer for absorbing an optical signal beam. The optical signal beam can be, e.g., an information bearing optical beam. The device is further equipped with a modulator having a low capacitance $C_m$ and a modulator absorbing layer for absorbing an optical power beam. The modulator absorbing layer has an electric field-dependent absorption coefficient. The optical power beam can be a continuous beam that is to be modulated by the optical signal beam. The device has a low resistivity region between the photodetector and the modulator such that the electric field-dependent absorption coefficient is altered uniformly and rapidly throughout the modulator absorbing layer during absorption of the optical signal beam in the detector absorbing layer. This uniform and rapid alteration of the absorption coefficient can be achieved by maximizing a diffusive electrical conduction across the low resistivity region. In addition, the device has a high resistivity element in series with the low resistivity region for minimizing a net charge flow to and from the device.

In one convenient embodiment the low resistivity region makes up a shared layer of the photodetector and modulator. In particular, the shared layer is a lower contact layer of the photodetector and an upper cladding layer of the modulator.

In the same or another embodiment the device is equipped with voltage sources for applying electric fields to the diodes. Specifically, a first voltage source is provided for applying a detector voltage to the photodetector and a second voltage source for applying a modulator voltage to the modulator. Preferably, the first voltage source applies the detector voltage such that it reverse biases the photodetector. Likewise, the second voltage source applies the modulator voltage such that it reverse biases the modulator.

The photodetector can be made up of an upper contact layer and a lower contact layer, these two layers sandwiching the detector absorbing layer between them. The modulator can be made up of an upper cladding layer and a lower cladding layer, these two layers sandwiching the modulator absorbing layer between them. In the preferred embodiment the upper cladding layer and the lower contact layer make up a common or shared layer between the two diodes. In this case, it is this shared layer that forms the low resistivity region. It is also convenient for the upper contact layer and the lower cladding layer to have a low resistivity, such that the voltage between the upper contact layer and the lower cladding layer remains substantially constant during operation.

Under reverse bias the absorption of the optical signal by the photodetector, specifically by the detector absorbing layer of the photodetector, creates photoinduced charge or photogenerated carriers. The carriers change the detector voltage and also the modulator voltage, whereby the absorption coefficient of the modulator absorbing layer is varied and hence the absorption of the optical power beam is altered.

In yet another embodiment the lower contact layer of the photodetector and the upper cladding layer of the modulator are not shared. Instead, a low resistivity element connects the lower contact layer and the upper cladding layer. In this case the low resistivity region is made up of the lower contact layer, the upper cladding layer and the low resistivity element joining these two layers.

Depending on the application of the device of invention, the optical power beam may or may not have a different wavelength than the optical signal beam. For example, in the case of wavelength switching the two wavelengths are different. On the other hand, in the case of signal filtering or performing other signal processing functions, e.g., reduction of wavelength spread, the wavelengths will typically be the same.

In some embodiments it is advantageous that the modulator absorption layer comprise a quantum well or a number of quantum wells. Furthermore, in order to ensure better modulation, it is convenient that an optical waveguide be provided in the modulator absorption layer for guiding the optical power beam. A mode confining structure can also be incorporated in the modulator absorption layer to determine the mode or modes that are guided by the optical waveguide.

The device of the invention can operate in the transmission or reflection mode. In other words, the modulated power beam can either be transmitted or reflected. When operating in the reflection mode a reflector for reflecting the optical power beam is provided.

In accordance with the invention, the semiconductor device of the invention can be used in building an optical cross-connect. In fact, a preferred embodiment of such optical cross-connect includes an array of devices such that a number of optical signal and optical power beams can be processed simultaneously. It is also advantageous to provide waveguides for guiding the optical power beams through the devices.

The method of the invention can be practiced using semiconductor devices as described above to process optical signals in communications networks and in other applications. A detailed description of the preferred embodiments of the invention is presented below in reference to the appended drawing figures.

DETAILED DESCRIPTION

Figure 1:
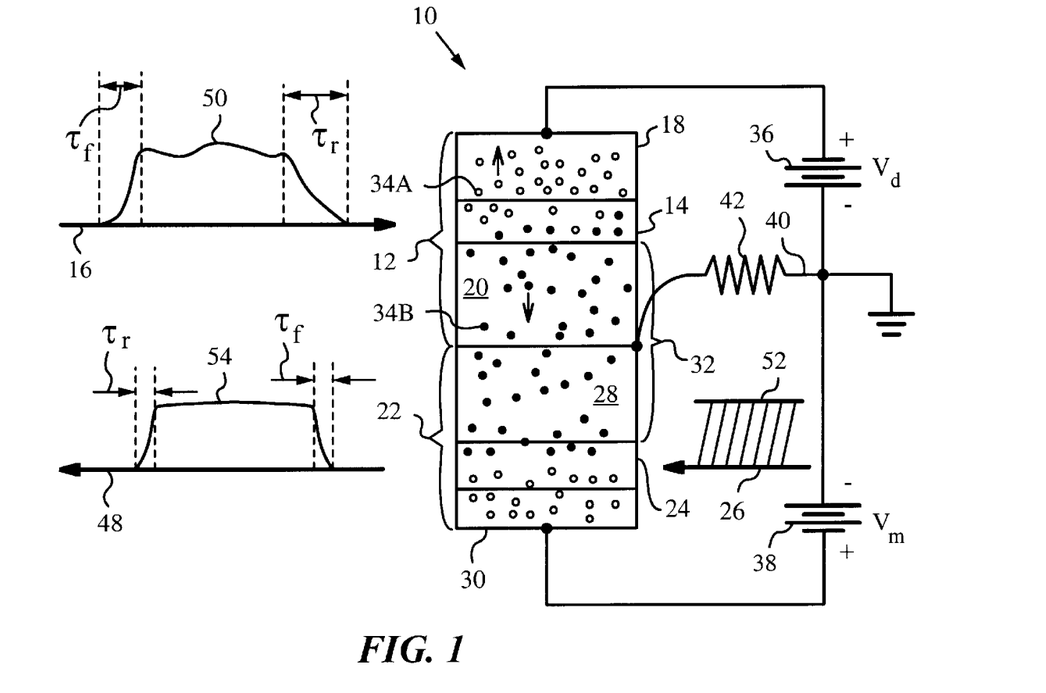
FIG. 1 is a diagram illustrating the general principles of operation of a semiconductor device according to the invention.

The present invention will be best understood by first reviewing the principles of operation of a semiconductor device 10 according to the invention as shown in FIG. 1. Device 10 has a photodetector 12, in this case an n-i-p photodiode whose detector absorbing layer 14 is designed to absorb photons of light from an optical signal beam 16. It should be noted that various photodetectors exhibiting low capacitance $C_d$ and capable of producing large numbers of photogenerated carriers 34 including negative carriers 34A (electrons) and positive charge carriers 34B (holes) in response to optical signal beam 16 can be used as photodetector 12. In the present embodiment, photodiode 12 has an upper contact layer 18 and a lower contact layer 20. Layers 18 and 20 sandwich detector absorbing layer 14.

Device 10 has a modulator 22 equipped with a modulator absorbing layer 24 that has an electric field-dependent absorption coefficient α, or has an electric field-dependent refractive index. Modulator absorbing layer 24 is designed to exhibit a variable level of absorption of photons of light in an optical power beam 26 that is to be modulated by optical signal beam 16 or to exhibit a variable level of refractive index for use in an electro-optic modulator for photons in an optical power beam 26 that is to be modulated by optical signal beam 16. It is understood that, when used in an electro-optic modulator, the layer 24 described as modulator absorbing layer need not absorb photons of light for operation of the device. Preferably, optical power beam 26 is a steady, continuous beam rather than a pulsed beam. Modulator 22 can be any convenient optical modulator, including devices such as a quantum well absorption modulator, Franz-Keldysh absorption modulator, superlattice absorption modulator, Mach-Zehnder electro-optic modulator or a directional coupler electro-optic modulator. Modulator 22 can be made out of any convenient material, including semiconductor structures or lithium niobate. It is not necessary that modulator 22 generate a photocurrent, nor is it deleterious if it does so. It is also preferable that modulator 22 exhibit a low capacitance C. In the present embodiment, modulator 22 has an upper cladding layer 28 and a lower cladding layer 30. Modulator absorbing layer 24 consists of a number of quantum wells.

A first voltage source 36 is connected to upper contact layer 18 and lower contact layer 20 for applying a detector voltage $V_d$ across photodiode 12. A second voltage source 38 is connected to upper cladding layer 28 and lower cladding layer 30 for applying a modulator voltage $V_m$ across modulator 22. Sources 36, 38 share a common electrical connection 40 to layers 20 and 28 across a series-switched high resistivity element 42. Element 42 can be a standard resistor, an adjustable resistor, or any other high resistivity element capable of restricting the flow of net charge to and from device 10, as described in more detail below. In this embodiment, the node at which sources 36, 38 and connection 40 join is grounded.

The polarities of sources 36, 38 are connected such that they reverse bias photodiode 12 and modulator 22 respectively. In particular, modulator voltage $V_m$ is chosen to reverse bias modulator 22 such that a large electric field is applied over the quantum wells of modulator absorbing layer 24. The application of modulator voltage $V_m$ induces absorption for photon energies below the band gap energy through the quantum-confined Stark effect (QCSE) electroabsorption mechanism. Through this mechanism, the band edge is shifted to lower photon energies with increasing electric field, as described in D. A. B. Miller, D. S. Chemla, T. C. Damen, A. C. Gossard, W. Wiegmann, T. H. Wood, and C. A. Burrus, "Electric Field Dependence of Optical Absorption Near the Bandgap of Quantum Well Structures," *Phys. Rev.* B32, 1043–1060 (1985), which is herein incorporated by reference.

Figure 2:
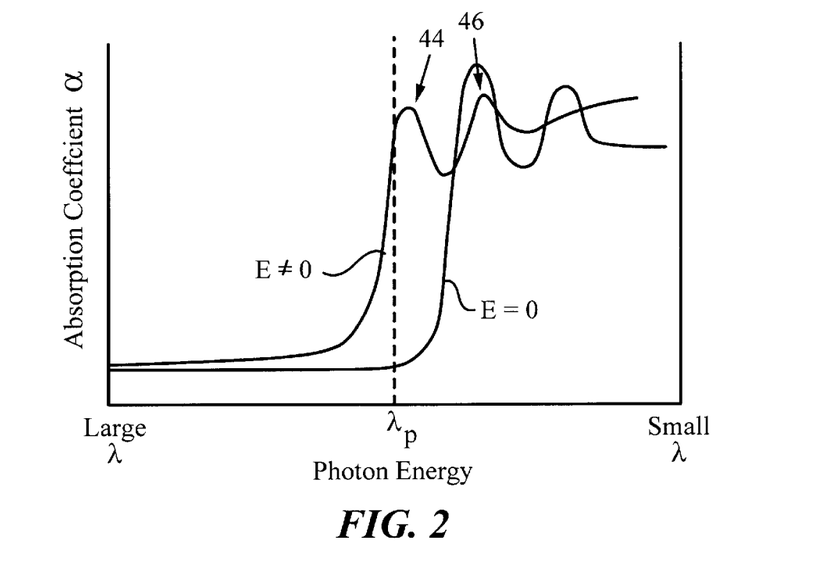
FIG. 2 is a graph of the electric field-dependent absorption coefficient α with and without an applied electric field.

Before considering operation of device 10, it is helpful to consider the effect of an applied electric field on absorption in quantum wells of modulator absorbing layer 24. This effect (QCSE) is responsible for the desired effect of modulation of absorption of optical power beam 26 by modulator absorbing layer 24. FIG. 2 is a graph of absorption coefficient α as a function of photon energy (hv) for a quantum well without an applied electric field (E=0) and with an applied electric field (E≠0) Peaks 44 and 46 correspond to heavy hole and light hole exciton absorption peaks, respectively. As illustrated in FIG. 2, an increasing electric field dramatically shifts the band edge to lower photon energies. Consider optical power beam 26 with wavelength $\lambda_p$. Without an applied modulator voltage $V_m$ or at zero field (E=0) optical power beam 26 passing through modulator absorption layer 24 encounters a negligible absorption coefficient α, and it will be almost completely transmitted. However, with an applied modulator voltage $V_m$ producing an applied field (E≠0), absorption coefficient α at $\lambda_p$ is finite and relatively large. Therefore, optical power beam 26 will be substantially absorbed in layer 24. Note that increased absorption under increased applied field is true for photon energies below the band gap of the unbiased quantum well material.

It is preferable that the conductivity of upper contact layer 18 and lower cladding layer 30 is high or, equivalently, the resistivities of layers 18, 30 are low. Specifically, these resistivities are sufficiently low to promote a rapid spreading of voltage over photodiode 12 and modulator 22.

Lower contact layer 20 of photodiode 12 and upper cladding layer 28 of modulator 22 are adjoined to form a common region of low resistivity 32 between photodiode 12 and modulator 22. In particular, the resistivity of region 32 is set sufficiently low to maximize a diffusive electrical conduction across low resistivity region 32 so that photocarriers generated in photodiode 12 can be rapidly shared with modulator 22. In other words, resistivity of region 32 is low enough to cause rapid and uniform variation of the electric field-dependent absorption coefficient throughout modulator absorbing layer 24 when photocarriers 34A, 34B are generated in detector absorbing layer 14.

To operate device 10 reverse bias $V_d$ is applied across photodiode 12. If photodiode 12 is not sufficiently reverse biased, it will not function efficiently as a photodetector, and any photodetection that takes place in it will not efficiently cause the desired operation of device 10 as an optically controlled optical switch or modulator. In the enabled, reverse biased condition, photodiode 12 functions efficiently as a photodetector of photons in optical signal beam 16. In particular, when optical signal beam 16 shines on photodiode 12, the photons constituting beam 16 are absorbed in detector absorbing layer 14 and generate photocarriers 34 which include mobile electrons 34A and holes 34B. These electrons 34A and holes 34B separate under the action of reverse bias field $V_d$ applied across photodiode 12. The separation of photocarriers 34A and 34B leads to a reduction of voltage within photodiode 12.

Since upper contact layer 18 and lower cladding layer 30 of device 10 are chosen to have low resistivities the overall voltage between upper contact layer 18 and lower cladding layer 30 is rapidly restored to its former value. In fact, materials for upper contact layer 18 and lower cladding layer 30 are chosen so that this restoration occurs much more quickly than any time scale of interest in device 10 and much more rapidly than the reaction times of any elements external to device 10. Thus, the voltage between upper contact layer 18 and lower cladding layer 30 remains essentially constant and set by bias voltages $V_d$ and $V_m$.

The operation of device 10 depends on this effectively constant voltage: when photocarriers 34 move within photodiode 12 to reduce the voltage there, they also move elsewhere to maintain the constant overall voltage. As a consequence of the voltage reduction in photodiode 12, reverse bias voltage $V_m$ across modulator 22 is also reduced locally within the structure of modulator 22. This reduction of voltage across modulator 22 changes the absorption coefficient α of modulator absorbing layer 24, thus modulating optical power beam 26 passing through modulator 22 in response to optical signal beam 16 landing on photodiode 12 to produce a modulated output beam 48.

The operation of device 10 further relies on generating a large number of photocarriers 34 by photodiode 12 and rapid sharing of photocarriers 34 with modulator 22 while preventing net flow of charge to and from device 10. The rapid sharing of photocarriers 34 is ensured by low resistivity region 32. In fact, the resistivity of region 32 should preferably be such that the resistance of region 32 between the two most widely separated ends of the device should be substantially less than the resistance value of high resistivity element 42. Under these conditions the mechanism of diffusive electrical conduction across region 32 is maximized and promotes rapid sharing of photocarriers 34. At the same time, high resistivity element 42 acts as a buffer that decouples the rapidly operating device 10 from the effects of external circuitry or elements, including the capacitance $C_{supply}$ associated with voltage sources 36 and 38. For such decoupling it is desirable that the product of the resistance $R_s$ of element 42 and the capacitance $C_{supply}$ associated with voltage supplies 36 and 3 8 is chosen to be a time substantially longer than the longest time of interest (such as a packet length in a packet switching system). Such a product can be achieved by increasing the value of $R_s$ or by adding capacitance in parallel with either voltage supply 36 or 38.

Maximization of diffusive electrical conduction across low resistivity region 32 while decoupling device 10 from external influences in this manner ensures that electric field-dependent absorption coefficient α is altered uniformly and rapidly throughout modulator absorbing layer 24. In fact, under these conditions, the absorption coefficient α is altered uniformly and rapidly throughout modulator absorbing layer 24 even if layer 24 has large lateral dimensions.

In a preferred embodiment capacitances $C_d$ and $C_m$ of photodiode 12 and modulator 22 are also considered in selecting the appropriate resistivities of region 32 and high resistivity element 42. As remarked above, capacitances $C_d$ and $C_m$ are chosen to be low. Furthermore, though modulator 22 can be chosen to be long so as to give sufficient modulation depth, photodetector 12 is preferably chosen to be small so as to reduce its capacitance as much as possible.

In accordance with well-known principles of electronics, circuits respond within a time constant or characteristic time that is the product of their resistance and capacitance. Top contact layer 18, bottom cladding layer 30 and region 32 all have extremely low resistances, as discussed above. The total resistance of these is insignificant in comparison to the resistance $R_s$ of high resistivity element 42. The total capacitance C of device 10 is the sum of capacitances $C_d$ and $C_m$. Thus, the characteristic time $T_c$ of device 10 is given by:

$$T_c \approx R_s (C_d + C_m).$$

In engineering device 10 the characteristic time $T_c$ should be kept small, preferably on the order of a few picoseconds. Any external circuitry (not shown) including sources 36, 38 for driving device 10 should be engineered to have a characteristic time which is significantly larger, e.g., one or more orders of magnitude larger than $T_c$. This forces the modulation action of device 10 to occur on time scales significantly shorter than the time it takes for any external circuitry to respond. It should also be noted that the modulation action of device 10 is confined within an active space defined by photodetector 12, modulator 22 and high resistivity element 42.

The modulation action of device 10 is best understood by considering signal beam 16 carrying information in successive pulses 50 (only one pulse shown for reasons of clarity). For example, each pulse 50 is coded with a bit of information. In this embodiment the characteristic time $T_c$ is preferably set approximately to match the pulse duration or, equivalently, the time duration of one bit of information of signal beam 16. Choosing $T_c$ to be shorter than such a bit time will still allow the device to work, but will lead to higher optical powers being required from the signal beam 16 on the photodetector 12. Since low optical signal powers are desirable, the preferred embodiment would not make $T_c$ substantially shorter than such a bit time. Making the time $T_c$ substantially longer than such a bit time will lead to poor fidelity of transfer of information from the signal beam 16 to the beam 48.

Power beam 26 is continuous and steady at an intensity level 52. When no photocarriers 34 populate modulator 22 the electric field across modulator absorbing layer 24 is non-zero (E≠0) because of reverse bias $V_m$ applied by source 38. Hence, absorption coefficient α is large (see FIG. 2) and power beam 26 is substantially absorbed by modulator 22.

When detector absorbing layer 14 absorbs photons of pulse 50 photocarriers 34 are created in photodiode 12. The above-described design of device 10 ensures that photocarriers 34 are shared with modulator 22 within characteristic time $T_c$. Thus, modulator 22 modulates the absorption coefficient α experienced by power beam 26 within characteristic time $T_c$. Specifically, photocarriers 34 shield modulator absorbing layer 24 from reverse bias $V_m$ and the electric field across modulator absorbing layer 24 drops. As a result, absorption coefficient α decreases (see FIG. 2) and power beam 26 experiences lower absorption and increased transmission. Therefore, output beam 48 representing the transmitted portion of power beam 26 issues from modulator 22.

The number of photocarriers 34 increases as the intensity of pulse 50 increases and the absorption coefficient α decreases. This occurs until the number of photocarriers 34 is large enough to completely screen modulator absorbing layer 24 from reverse bias $V_m$ and the electric field across modulator absorbing layer 24 is zero (E=0). At this point, absorption coefficient α is at its minimum, power beam 26 experiences substantially no absorption and output beam 48 exhibits its highest intensity level. The full range of intensity level variation of output beam 48 is called the modulation depth. In operation, an acceptable minimum absorption coefficient α may be reached without the necessity of completely screening the electric field across modulator absorbing layer 24, in which case the optical power in signal beam 16 may preferably be chosen to be just sufficient to achieve such acceptable minimum absorption coefficient. In operation of the device, the modulator bias voltage 38 may also be chosen so as to give sufficient modulation depth with the minimum optical power in beam 16. Such a choice of operating voltage may be made during operation of the device by observing the modulation depth while adjusting voltage 38 and adjusting the signal power in beam 16 so as to achieve sufficient modulation depth with the minimum power in beam 16. Such an optimization can be repeated for each choice of wavelength for power beam 26.

Pulse 50 of signal beam 16 incident on photodiode 12 thus causes modulation of the transmission of power beam 26 through modulator 22 and produces an output pulse 54 (only one shown). The design of device 10 permits the user to set characteristic time $T_c$ at a value of approximately 10 picoseconds or a few 10's of picoseconds which corresponds to modulation of power beam 26 at bit rates as high as tens of gigabits per second. In other words, tens of gigapulses 50 per second can be translated by device 10 to output pulses 54. This characteristic time $T_c$ represents the dominant time taken for the device to recover after excitation by a pulse of light in signal beam 16.

In order for device 10 to be ready to receive the next pulse 50 in signal beam 16, it is important that the recovery mechanism from photocarriers 34 moving through low resistivity region 32 will have taken place before the next pulse 50 arrives. This mechanism of recovery is also diffusive electrical conduction and, because of the choice of low resistivity values in layers 20 and 28, occurs on picosecond time scales.

It should be noted that larger beams cause a voltage change across a larger area of the layers, and therefore require a longer recovery time. Preferably, for typical communications applications, spot sizes are less than 20 μm in diameter, and more preferably below 5 μm are used for signal beam 16. It is possible to perform a more sophisticated analysis of the spreading of charge over diode structures following absorption of light in specific regions of the diode. This has been discussed in Livescu et al., "High-speed absorption recovery in quantum well diodes by diffusive electrical conduction," *Appl. Phys. Lett.*, 54, 748–750 (1989); in Yairi et al., "High-Speed Quantum Well Optoelectronic Gate Based on Diffusive Conduction Recovery," in *Optics in Computing* '98, Pierre Chavel, David A. B. Miller, Hugo Thienpont, Editors, (Optics in Computing '98 Conference, Brugge, Belgium (June 17–20, 1998)), *Proc. SPIE*, Vol. 3490, 10–13 (1998); and in Yairi et al., "High-speed, optically controlled surface-normal optical switch based on diffusive conduction," *Appl. Phys. Lett.*, 75, 597–599 (1999), all of which are herein incorporated by reference.

The wavelength of signal beam 16 and the wavelength of power beam 26 can be the same or different, depending on application. For example, the wavelengths are different when device 10 is used as a wavelength converter, while the wavelengths can be the same when device 10 is used to regenerate the bits or pulses of signal beam 16 or reducing its wavelength spread.

In the embodiment of FIG. 1, the wavelengths of signal beam 16 and power beam 26 are the same, and device 10 is used to improve the quality of pulse 50. Specifically, pulse 50 has a rise time $\tau_r$ and a fall time $\tau_f$ that are not sharp. In addition, the intensity level of pulse 50 is unstable. Because the modulation behavior of device 10 may be chosen not to be linear with voltage, but may instead be quite abrupt over specific ranges of voltage, a smoothly rising or falling input pulse 50 can give rise to an abruptly rising or falling output pulse 54.

Device 10 and its operating principles can be altered in many ways to provide optical switches and modulators, including devices which can be used for wavelength switching in optical networks such as WDM networks. Device 10 can also be integrated into array structures that can operate on many optical signal beams simultaneously. The below embodiments serve to illustrate how the principles of the invention can be implemented in such modulators and switches.

Figure 3:
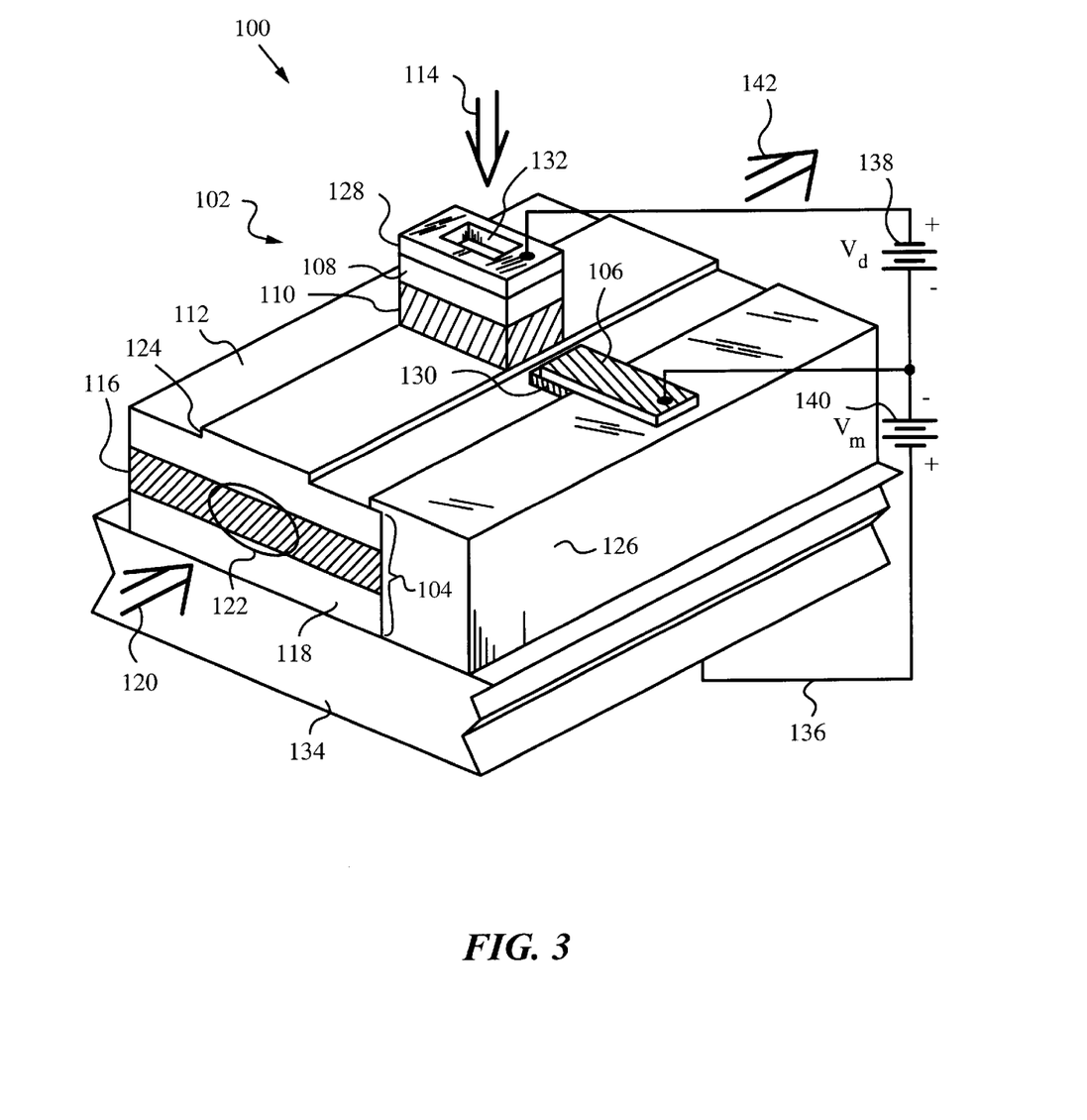
FIG. 3 is an isometric view of an integrated semiconductor device according to the invention.

FIG. 3 is an isometric view of an integrated semiconductor device 100 built in accordance with the invention. Device 100 is integrated such that the capacitance C is as small as possible and such that additional capacitance contributions associated with any connections between a photodetector 102, a modulator 104 and a high resistivity element 106 are minimized. Photodetector 102 is a detector diode made of an upper contact layer 108 made of n-doped semiconductor material, a detector absorbing layer 110 made of undoped semiconductor material, and an upper cladding layer 112 made of p-doped semiconductor. Preferably, the material of detector absorbing layer 110 is chosen to be absorbing for all wavelengths of interest in an optical signal beam 114. At the same time, upper contact layer 108 is chosen to be transmitting for all the wavelengths of interest in signal beam 114. Such choices of transmitting or absorbing material can be made through appropriate choice of semiconductor materials for layers 108 and 110, as is well known to those skilled in the art. For example upper contact layer 108 can be made from indium phosphide indium aluminum arsenide or indium gallium aluminum arsenide with a sufficiently high aluminum concentration to make it transparent at the wavelengths of interest, such concentrations being known to those skilled in the art and absorbing layer 110 can be made from indium gallium arsenide. Such a choice of materials allows absorbing layer 110 to be absorbing for wavelengths in the 1.3 to 1.6 micron spectral region commonly of interest for optical communications while allowing upper contact layer 108 to be substantially transparent for this same wavelength region.

Modulator 104 is a diode formed of upper cladding layer 112, a quantum well modulator absorbing layer 116, and a lower cladding layer 118. Note that upper cladding layer 112 in this embodiment is shared by detector diode 102 and modulator diode 104. In fact, upper cladding layer 112 forms a common low resistivity region in this embodiment. Modulator absorbing layer 116 has one or more quantum well layers, preferably undoped, and it can also include other undoped semiconductor layers that are substantially transparent at the wavelengths of interest for signal beam 114. A quantum well layer can be a thin layer of low bandgap semiconductor material, such as indium gallium arsenide, with a thickness of 3–15 nm, sandwiched between layers of material such as indium phosphide, indium gallium arsenide phosphide or indium gallium aluminum arsenide, with higher bandgap. Alternating layers of such low and high bandgap materials can be used to form multiple quantum well layers. Other materials suitable for quantum well layers are well known to those skilled in the art. Design techniques for choosing layer thicknesses and material compositions to form quantum wells with particular properties are also well known.

Lower cladding layer 118 is preferably n-doped. The materials chosen for layers 112, 116, 118 are preferably chosen such that, with the exception of quantum well layers in layer 116, they are substantially transparent to the wavelengths of interest in an optical power beam 120. Again, for telecommunications wavelengths, an appropriate material for such transparent layers is indium phosphide, although other materials known to those skilled in the art are possible and include indium aluminum arsenide and indium gallium aluminum arsenide with a sufficiently high aluminum concentration to make it transparent at the wavelengths of interest.

Layers 112, 116, 118 are designed to form a waveguide structure. Many types of waveguide structures are known to those skilled in the art. For example, layers 112, 116, 118 may themselves include additional layers of differing refractive index to form more effective waveguides, and they can be formed in more complex lateral structures such as buried heterostructures that are well known in the art. In the present embodiment, the waveguide structure formed of layers 112, 116, 118 has a higher index of refraction in layer 112, and a lower index of refraction in layers 116, 118 so as to form a waveguide in which light in the waveguide mode is bound. The cross-section of an exemplary waveguide mode 122 is indicated by an ellipse, though it is understood that the waveguide mode typically has a cross-sectional intensity that varies smoothly in the lateral dimensions. In the present embodiment waveguide mode 122 is confined in the lateral direction by edges of a ridge 124 formed in layer 112. Conveniently, ridge 124 can be formed in an etching process that also etches layers 108 and 110. In fact, any known methods of lateral confinement of waveguide mode 122, such as buried heterostructures, known to those skilled in the art can be used to ensure proper guiding of power beam 120.

High resistivity element 106 is a resistor formed on top of an insulating material 126. Resistor 106 can be formed by thin film deposition from a material such as TaN, which is well known to have predictable and stable resistive properties. Insulating material 126 can be polyimide, such as benzocyclobutene (BCB) based polymer dielectric available from the Dow Chemical Company, or other known insulating materials.

An electrical contacting material 128 is used to establish contact to upper contact layer 108 and an electrical contacting material 130 is used to establish contact to upper cladding layer 112. Materials 128 and 130 can be metals that are opaque to beams 114 and 120. Hence material 128 has a window 132 to allow signal beam 114 to shine into diode 102.

The structure of device 100 is grown on a substrate 134, which is preferably n-doped indium phosphide when device 100 is intended for use at telecommunication wavelengths. An electrical connection 136 is made to substrate 134. An electrical contacting material can be used in joining connection 136 to substrate 134, as required. Appropriate electrical contacting techniques, such as alloying of contacts form improved electrical connections, are well known to those skilled in the art.

A first voltage source 138 for applying a reverse bias $V_d$ to diode 102 and a second voltage source 140 for applying a reverse bias $V_m$ to modulator 104 are connected to device 100 via contacting material 128, 130 and electrical contact 136. It is understood that the polarity of layers 108, 112 and 118 can be chosen to be p, n and p respectively, in which the electrical polarity of sources 138, 140 should be reversed. In such a case, the polarity of substrate 134 should also be changed to p. It is also understood that electrical connection 136 shown connecting to substrate 134 can alternatively be made to layer 118, in which case substrate 134 can exhibit any desired doping, including semi-insulating doping. Semi-insulating doping of substrate 134 has the additional advantage of leading to lower stray capacitances in device 100.

It is also understood that the horizontal and vertical extent of device 100 may be very different from that shown in FIG. 3. Specifically, the vertical extent of detector and modulator diodes 102, 104 will typically cover only several microns, whereas the horizontal extent of diode 104 and elements 130, 106 and 126 can be much larger that this. It is also understood that layer 126 can be made much thicker than modulator diode 104 in some regions so as to reduce the capacitance between resistor 106 and substrate 134. That is desirable because any parasitic capacitances undesirably slow down the operation of device 100, because they will share the photocarriers generated during operation of device 100. This, in turn, will reduce the modulation depth of output beam 142.

It should be noted that large external capacitances, such as pad capacitances act more like batteries. In other words, large external capacitances act like charged batteries to device 100 on time scales of characteristic time $T_c$ and do not impair its function. However, any parasitic capacitance connected to resistor 106 or contacting material 130 and/or otherwise in electrical contact with low resistivity region 112 will undesirably slow down the response of device 100 because the parasitic capacitance will share the photocarriers generated in diode 102. In addition, parasitic capacitances will act to reduce the modulation depth of output beam 142.

Device 100 can be used in modulating or switching optical signals in a WDM network or for performing switching or modulation of other types of optical signals. Furthermore, a number of such devices can be integrated to form an array of optical modulators. For this purpose, the length of device 100 can be extended and additional diodes 102 can be mounted on top of layer 112 at appropriate spacing. The use of the waveguide structure is particularly well suited for this application.

Figure 4:
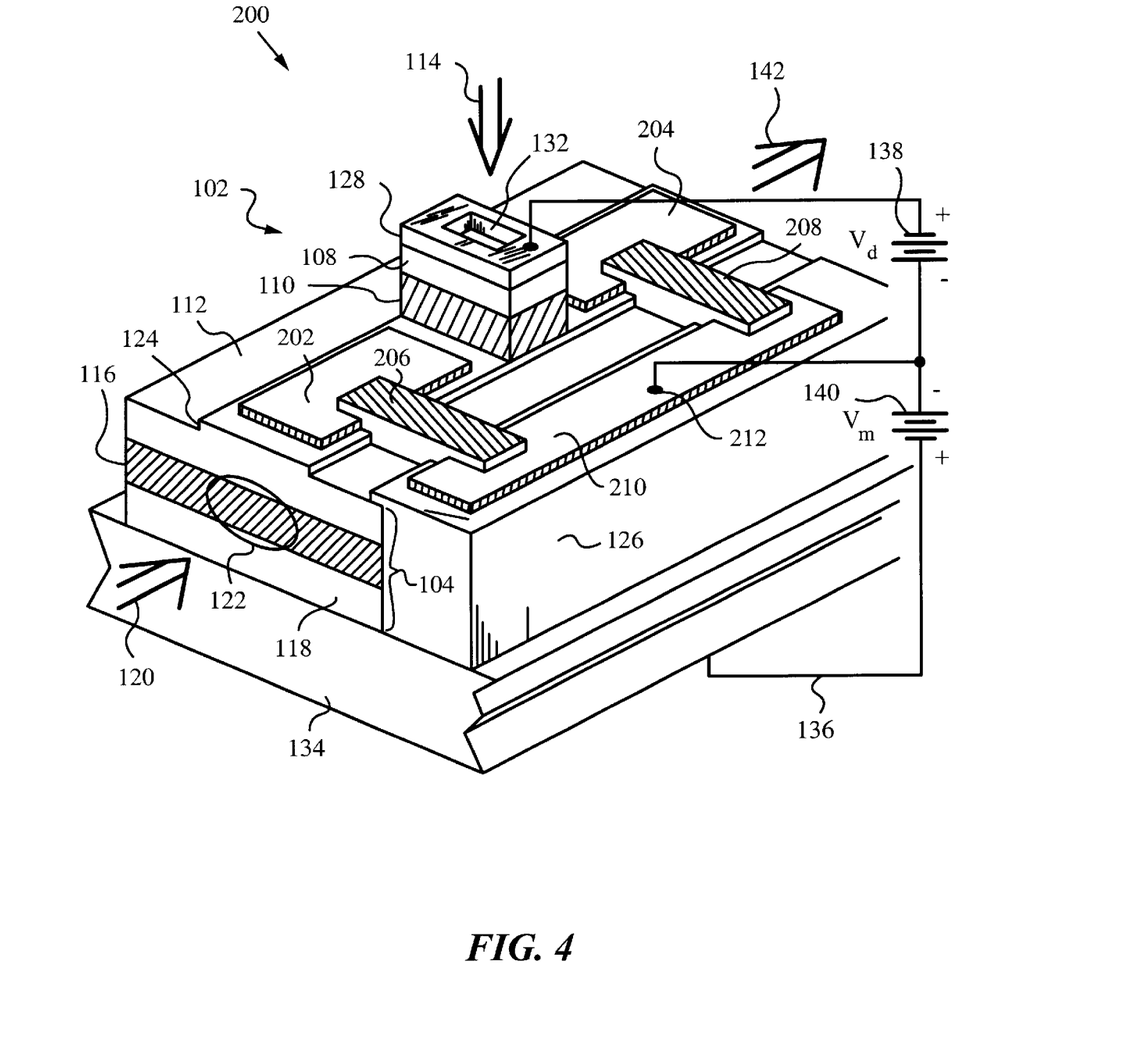
FIG. 4 is an isometric view of yet another embodiment of a semiconductor device according to the invention.

Another embodiment of a semiconductor device 200 is shown in an isometric view in FIG. 4. Device 200 shares a number of parts with device 100. These parts are referenced by the same reference numerals and will not be further discussed. Device 200 has conducting contacting layers 202, 204 formed on top of ridge 124 in upper cladding layer 112. Layers 202, 204 now perform the function of former electrical contacting material 130 in establishing an electrical contact to upper cladding layer 112. Layers 202, 204 are placed substantially along ridge 124 of the waveguide structure for the purpose of increasing the speed with which voltage changes stimulated by shining of signal beam 114 onto detector diode 102 are communicated along the length of the waveguide of device 200. In this embodiment, the high resistivity element consists of two resistors 206, 208 connected to layers 202, 204 respectively. Resistors 206, 208 are connected to a common bonding pad 210, which is also connected to a common terminal 212 of first and second voltage sources 138, 140.

Figure 5:
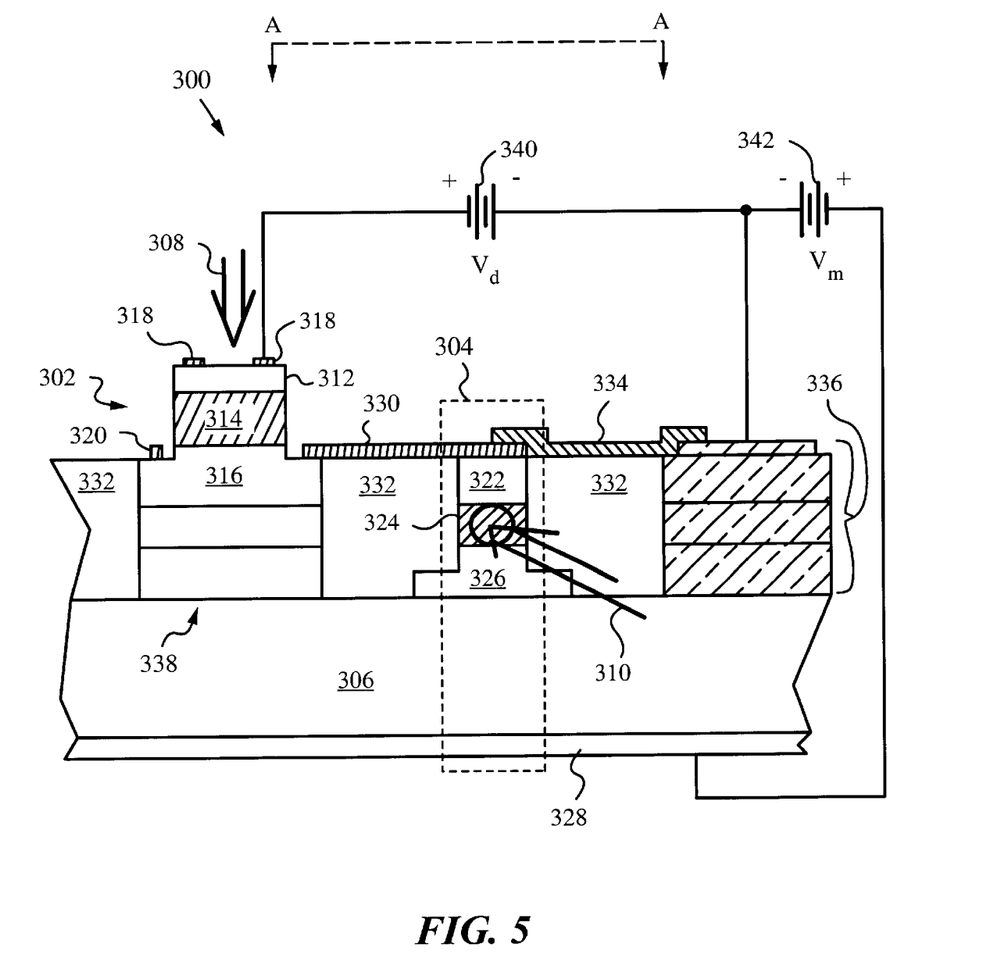
FIG. 5 is a cross-sectional plan view of yet another integrated semiconductor device according to the invention.

FIG. 5 shows in cross-sectional plan view another embodiment of an integrated semiconductor device 300. The cross-section is taken along line A—A. Device 300 has a surface-normal photodetector or detector diode 302 and, next to it, a modulator 304, here a waveguide modulator diode. Both diodes 302, 304 are epitaxially grown on a common substrate 306. In this configuration, an optical signal beam 308 shines on diode 302 from above, and optical power beam 310 is incident onto an end of waveguide 304.

Diode 302 is a p-i-n diode made of an n-doped upper contact layer 312, an undoped (intrinsic) detector absorbing layer 314, a p-doped lower contact layer 316 with two metal ohmic contacts 318, 320 on the top and bottom of diode 302. Waveguide modulator 304 is also a p-i-n diode with a p-doped upper cladding layer 322, an undoped (intrinsic) modulator absorbing layer 324 and an n-doped bottom cladding layer 326. Modulator absorbing layer 324, whose absorption coefficient $\alpha$ is dependent on the electric field, can either include quantum wells or bulk semiconductor material designed to operate as a Franz-Keldysh electroabsorption modulator. Layers 322, 326 serve as upper and lower claddings of waveguide 304, respectively, and layer 324 as the core. Layer 324 can also be distributed such that parts of it adjacent to layers 322, 326 are part of the cladding instead of the core of waveguide 304. P-doped layers 316, 322 are made of the same epitaxial layer. A bottom n-contact 328 of modulator diode 304 is deposited on the back of substrate 306 that is n-doped to make an ohmic contact.

Detector and modulator diodes 302, 304 are electrically connected by a conducting layer 330 of metal, e.g., gold, deposited on top of an insulating material 332 between p-doped layers 312 and 322. Conducting layer 330 makes ohmic contacts to both layers 312 and 322 and covers waveguide modulator diode 304. Conducting layer 330 has a negligibly small resistance and together with layers 312 and 322 defines a low resistivity region. Conducting layer 330 is connected to a bonding pad 336, which is the common ground, via a high resistivity element 334, here in the form of a thin film resistor. Resistor 334 is also deposited on top of insulating material 332, like conducting layer 330.

A first voltage source 340 is connected across diode 302 and a second voltage source 342 is connected across diode 304. Sources 340, 342 are arranged to apply reverse bias voltages $V_d$ and $V_m$ across diodes 302, 304 respectively.

As discussed above, it is preferable that conducting layer 330 and resistor 334 have as low a capacitance as possible. For that reason, insulating material 332 on which they are deposited has a low dielectric constant. For example, material 332 is polyimide such as BCB or even air. In the latter case, layer 330 and resistor 334 form bridge contacts. By the same token, unused diode 338 on which diode 302 is located, introduces additional unwanted capacitance that should also be minimized. Resistor 334 can be made of various materials, including TaN, Ti and NiCr. TaN is preferred because of its low temperature coefficient of resistance. A semiconductor material could alternatively be used as thin film resistor 334. For further information on this subject the reader is referred to the book *Modern GaAs Processing Methods*, by Ralph Williams, Artech House, 1990, pp. 305–307, which is herein incorporated by reference.

Bonding pad 336 is preferably made large to provide a large capacitance. Thus, pad 336 keeps its bias voltage virtually constant despite the voltage change that appears across diodes 302, 304 during switching. Hence, pad 336 acts as a charged battery. Moreover, when pad 336 has a large capacitance, the external circuit and any external circuit elements are made slow and switching is forced to take place predominantly among elements 302, 304 and 334 as the voltage produced by the photocarriers across diodes 302 and 304 decays through resistor 334 onto the "battery-like" pad 336.

Figure 6:
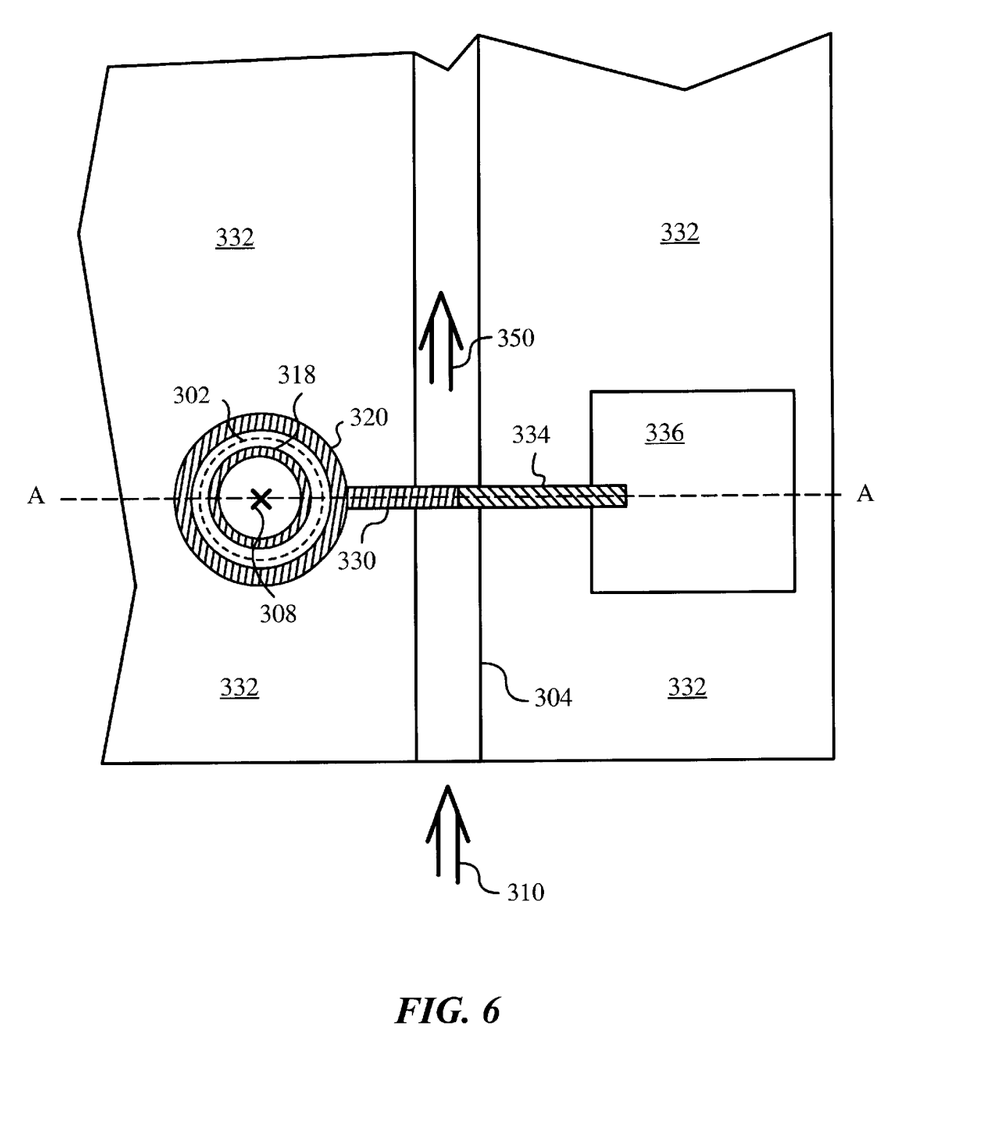
FIG. 6 is a top plan view of the device of FIG. 5.

FIG. 6 shows a top plan view of device 300. In this view it is clear how surface normal detector diode 302 and waveguide modulator 304 are connected by conducting layer 330 that is connected to bonding pad 336 through resistor 334. Advantageously, device 300 is presented in the form of a chip, which is planarized with insulating material 332 everywhere other than the mesa created by diode 302. In the present embodiment diode 302 is circular to achieve lowest capacitance for a given spot size of signal beam 308. Of course, the mesa constituting diode 302 can also have other shapes. During operation, power beam 310 enters waveguide 304 and is modulated by signal beam 308 in accordance with the principles of operation described above to yield a modulated output beam 350.

Side-by-side integration of photodetector or detector 302 and modulator 304 introduces great flexibility into the detector design. The waveguide features are typically as small as a few microns. Therefore, if the detector is placed on top of the ridge of the waveguide, as in some of the previous embodiments, the waveguide features may limit the width of detector diode that can be built on the top to be as small as a few microns. Processing such small detectors on top of waveguides may be difficult. Furthermore, the spot size of the signal beam focused on the detector may be constrained to be a few microns in diameter, which may make the optical alignment harder. Even in the case of optimal alignment, it is possible that the detector is overfilled with signal beam. The signal beam could then spill over the modulator and could be detrimental to the operation of the device. The side-by-side integration of device 300 avoids this problem and can thus be very advantageous in many applications.

Figure 7:
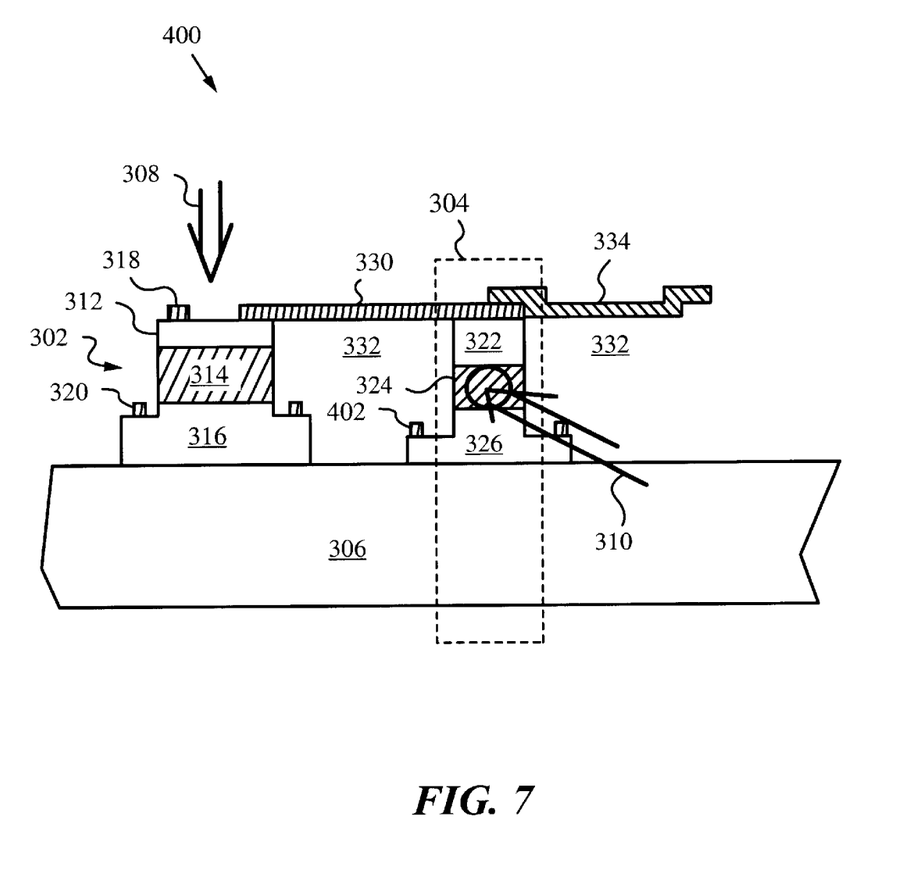
FIG. 7 is a cross-sectional plan view of still another integrated semiconductor device according to the invention.

FIG. 7 shows in cross-sectional plan view another embodiment of an integrated semiconductor device 400 similar to device 300. The same reference numerals are used to denote corresponding parts. Device 400 is similar to device 300, except that detector 302 sits directly on top of insulating substrate 306. The unused epitaxial layers 338 (diode 338) and any detrimental capacitive effects associated with them are thus eliminated.

For clarity, the electrical connections and bonding pad are not shown in FIG. 7. The order of p-i-n layers of detector 302 is reversed, p-doped layer 312 is the top contact layer connected via conducting layer 330 to p-doped layer 322 of waveguide modulator 304. Layer 316 in n-doped and metal ohmic contact 320 is connected to the positive terminal of first source 340. An n-contact 402 of modulator 304 is laid down on the epitaxially grown, n-layer 326. Contact 402 is connected to second source 342.

Device 400 not only eliminates the parasitic capacitance introduced by unused diode 318, but also results in a planar structure, easing packing requirements. As shown in FIG. 7, different sets of epitaxial layers for detector 302 and modulator 304 can be used by growing the second epitaxial layer set after processing the first. Such regrowth techniques are well known to those skilled in the art. Alternatively, a single epitaxial layer set can be utilized for both detector 302 and modulator 304, with careful design of the layers to make sure that the detection and modulation functions can be accomplished properly using the same layers. For instance, if modulator 304 is designed to have a quantum well modulator absorbing layer 324, then it is important to ensure that the quantum wells are designed not to significantly slow down the vertical separation of the photocarriers in detector 302.

In the case where the same grown layer structure is used for both detector 302 and modulator 304, and where layers 314 and 324 use quantum wells, it is desirable to reverse bias detector 302 to such a degree that the quantum wells in detector 302 become absorbing at all of the wavelengths of interest for signal beam 308. As is well known to those skilled in the art, quantum well material becomes absorbing at increasingly long wavelengths as a larger electric field is applied to it, through effects such as the QCSE. Similar reverse biasing is also appropriate when bulk material is used in layers 314, 324, in which case the change in absorption occurs through the Franz-Keldysh effect.

Figure 8:
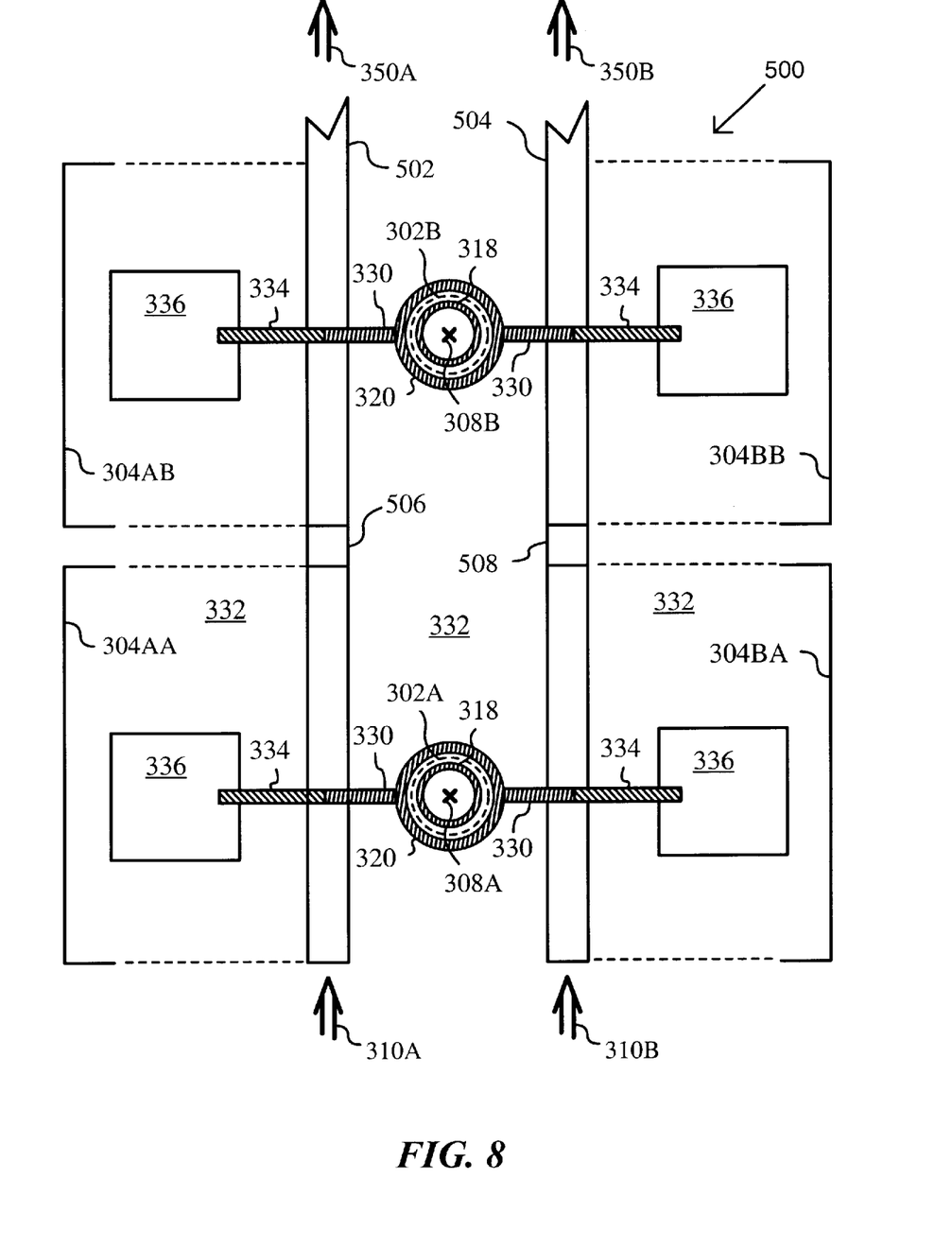
FIG. 8 is a top plan view of a 2×2 switch built of devices according to the invention.

FIG. 8 is a top plan view of a 2×2 switch array 500 using two detectors 302A, 302B and four waveguide modulators 304AA, 304AB, 304BA, 304BB distributed in two parallel waveguides 502, 504 as shown. The transmissivity of modulators 304AA, 304BA is controlled by detector 302A, which is electrically connected to both of them in accordance with the invention. Similarly, the transmissivity of modulators 304AB, 304BB is controlled by detector 302B which is electrically connected to them. Electrical insulation between modulators in waveguide 502 is achieved by electrical isolation region 506 and electrical insulation between modulators in waveguide 504 is secured by electrical isolation region 508. Electrical isolation regions 506, 508 can be produced by a number of different methods, including etch isolation or proton implantation, which are well known to those skilled in the art.

Switch array 500 processes two signal beams 308A and 308B, two power beams 310A, 310B and two output beams 350A, 350B. The function of array 500 is to arbitrarily transfer the data encoded in any of signal beams 308A, 308B to either output beam 350A or 350B. Signal beam 308A is incident on detector 302A and signal beam 308B is incident on detector 302B. Power beam 310A travels down waveguide 502 to generate output beam 350A. Similarly, power beam 310B travels down waveguide 504 to generate output beam 350B.

Now, in the lower half of switch array 500 detector 302A and modulators 304AA and 304BA are electrically connected. Thus, photocarriers produced by signal beam 308A in detector 302A are shared between modulators 304AA and 304BA. By properly biasing modulator 304AA using second voltage source (not shown in this figure), modulator 304AA is selected as the one to which signal beam 308A transfers its data. Hence, information incident in signal beam 308A is switched to appear on output beam 350A. Alternatively, the situation can be reversed by properly biasing modulator 304BA so that the data is switched to output beam 350B.

An exemplary proper biasing of modulators 304AA and 304BA to give transfer of information in incident signal beam 308A to output beam 350A but not to output beam 350B is as follows. First, modulator 304AA is reverse biased so that, in the absence of incident signal beam 308A, it is strongly absorbing for incident power beam 310A. Second, modulator 304BA is biased so that it is not substantially absorbing for incident power beam 310B. In this exemplary case, it may still be desirable to have some reverse bias on modulator 304BA so as to keep its capacitance low and also allow some voltage swing across it during the operation of array 500 without having it go too far into forward bias. If modulator 304BA goes too far into forward bias, it will limit the voltage swing desired for modulator 304AA during operation. In taking these guidelines and other electronic considerations well-known to a person skilled in the art, one can individually bias each modulator 304AA, 304BA to be active or inactive and thus arbitrarily electrically configure switch array 500 to transfer input information from signal beam 308A to either one of power beams 310A, 310B.

Clearly, the same method can be applied to the upper half of array 500 to thus enable array 500 to operate as a 2×2 switch. Thus, array 500 can be used to switch input information from signal beams 308A, 308B to output beams 350A, 350B in any desired switching configuration.

It should be noted that, regardless of the switching configuration, photocarriers are shared between the detector and the two modulators on either side. Therefore, switch 500 allows for multicasting, provided that two signal beams are not incident simultaneously, that is, in which the information from one signal beam is transferred to both output beams. However, if multicasting is not used (i.e., one signal beam switches only one modulator at a time), the overall switch efficiency is roughly halved because about half of the photocarriers will not be used to transfer data. To eliminate this problem, it is possible to redesign the switch fabric so that there are electrical gates at the connection points between the detector and the modulator. The gate that connects the detector to the modulator that is to be switched could be short-circuited, whereas the one that links the detector to the modulator that is not to be switched could be open-circuited. Consequently, only the modulator configured to switch will share the photocarriers with the detector. Such gates can be made through either monolithically integrating a transistor or a diode onto the chip or by flip-chip bonding an electronic control circuit. It is understood that such gates should not introduce large parasitic capacitance for the reasons discussed above.

Many other embodiments of the semiconductor device and cross-connects according to the invention are possible. The use of other material systems, such as gallium arsenide and aluminum gallium arsenide, is also possible, and such choices will be obvious to a person skilled in the art. Therefore, the scope of the invention should be judged by the appended claims and their legal equivalents.

We claim:

1. A semiconductor device comprising:
    a) a photodetector having a low capacitance $C_d$ and a detector absorbing layer for absorbing an optical signal beam;
    b) a modulator having a low capacitance $C_m$ and a modulator absorbing layer for absorbing an optical power beam, said modulator absorbing layer having an electric field-dependent absorption coefficient;
    c) a low resistivity region provided between said photodetector and said modulator such that said electric field-dependent absorption coefficient is altered uniformly and rapidly throughout said modulator absorbing layer on absorption of said optical signal beam; and
    d) a high resistivity element in series with said low resistivity region for minimizing a net charge flow to and from said semiconductor device.

2. The semiconductor device of claim 1, wherein said low resistivity region is selected to maximize a diffusive electrical conduction across said low resistivity region.

3. The semiconductor device of claim 1, wherein said low resistivity region comprises a shared layer of said photodetector and said modulator.

4. The semiconductor device of claim 3, wherein said shared layer comprises a lower contact layer of said photodetector and an upper cladding layer of said modulator.

5. The semiconductor device of claim 1, further comprising:
    a) a first voltage source for applying a detector voltage to said photodetector; and
    b) a second voltage source for applying a modulator voltage to said modulator.

6. The semiconductor device of claim 5, wherein said first voltage source for applying said detector voltage reverse biases said photodetector.

7. The semiconductor device of claim 5, wherein said second voltage source for applying said modulator voltage reverse biases said modulator.

8. The semiconductor device of claim 5, wherein:
    a) said photodetector further comprises an upper contact layer and a lower contact layer sandwiching said detector absorbing layer therebetween;
    b) said modulator further comprises an upper cladding layer and a lower cladding layer sandwiching said modulator absorbing layer therebetween; and
    c) said lower contact layer and said upper cladding layer comprise a shared layer, said shared layer comprising said low resistivity region.

9. The semiconductor device of claim 8, wherein said upper contact layer and said lower cladding layer have a low resistivity such that the voltage between said upper contact layer and said lower cladding layer is substantially constant.

10. The semiconductor device of claim 8, wherein:
    a) said first voltage source for applying said detector voltage reverse biases said photodetector;
    b) said second voltage source for applying said modulator voltage reverse biases said modulator; and
    whereby absorption of said optical signal beam by said photodetector creates photogenerated carriers that change said detector voltage and change said modulator voltage, whereby said absorption coefficient is altered and absorption of said optical power beam is altered.

11. The semiconductor device of claim 5, wherein:
    a) said photodetector further comprises an upper contact layer and a lower contact layer sandwiching said detector absorbing layer therebetween;
    b) said modulator further comprises an upper cladding layer and a lower cladding layer sandwiching said modulator absorbing layer therebetween; and
    c) said low resistivity region comprises said lower contact layer, said upper cladding layer, and a low resistivity element connecting said lower contact layer and said upper cladding layer.

12. The semiconductor device of claim 11, wherein said upper contact layer and said lower cladding layer have a low resistivity such that the voltage between said upper contact layer and said lower cladding layer is substantially constant.

13. The semiconductor device of claim 11, wherein:
    a) said first voltage source for applying said detector voltage reverse biases said photodetector;
    b) said second voltage source for applying said modulator voltage reverse biases said modulator; and
    whereby absorption of said optical signal beam by said photodetector creates electrical carriers that change said detector voltage and change said modulator voltage, whereby said absorption coefficient is altered and absorption of said optical power beam is altered.

14. The semiconductor device of claim 1, wherein said optical power beam has a different wavelength than said optical signal beam.

15. The semiconductor device of claim 1, wherein said optical power beam has the same wavelength as said optical signal beam.

16. The semiconductor device of claim 1, wherein said modulator absorption layer comprises at least one quantum well.

17. The semiconductor device of claim 1, wherein said modulator absorption layer comprises an optical waveguide for guiding said optical power beam.

18. The semiconductor device of claim 17, further comprising a mode confining structure for determining at least one guided mode of light in said optical waveguide.

19. The semiconductor device of claim 1, further comprising a reflector for reflecting said optical power beam.

20. An optical cross-connect having at least one semiconductor device comprising:
   a) a photodetector having a low capacitance $C_d$ and a detector absorbing layer for absorbing an optical signal beam;
   b) a modulator having a low capacitance $C_m$ and a modulator absorbing layer for absorbing an optical power beam, said modulator absorbing layer having an electric field-dependent absorption coefficient;
   c) a low resistivity region provided between said photodetector and said modulator such that said electric field-dependent absorption coefficient is altered uniformly and rapidly throughout said modulator absorbing layer on absorption of said optical signal beam; and
   d) a high resistivity element in series with said low resistivity region for minimizing a net charge flow to and from said semiconductor device.

21. The optical cross-connect of claim 20, wherein said low resistivity region is selected to maximize a diffusive electrical conduction across said low resistivity region.

22. The optical cross-connect of claim 20, comprising an array of said semiconductor devices.

23. The optical cross-connect of claim 22, further comprising at least one waveguide for guiding said optical power beam through at least one of said semiconductor devices.

24. The semiconductor device of claim 20, wherein said optical power beam has a different wavelength than said optical signal beam.

25. The semiconductor device of claim 20, wherein said optical power beam has the same wavelength as said optical signal beam.

26. A method of operating a semiconductor device for modulating an optical power beam by an optical signal beam, said method comprising:
   a) providing a photodetector having a detector absorbing layer for absorbing said optical signal beam;
   b) providing a modulator having a modulator absorbing layer for absorbing said optical power beam, said modulator absorbing layer having an electric field-dependent absorption coefficient;
   c) providing a low resistivity region between said photodetector and said modulator such that said electric field-dependent absorption coefficient is altered uniformly and rapidly throughout said modulator absorbing layer during absorption of said optical signal beam; and
   d) minimizing charge flow to and from said semiconductor device with a high resistivity element in series with said low resistivity region.

27. The method of claim 26, further comprising the step of maximizing a diffusive electrical conduction across said low resistivity region.

28. The method of claim 26, further comprising:
   a) reverse biasing said photodetector; and
   b) reverse biasing said modulator.

29. The method of claim 26, further comprising reflecting said optical power beam.

30. The method of claim 26, further comprising transmitting said optical power beam.

* * * * *